United States Patent
Homann et al.

[11] Patent Number: 5,957,511
[45] Date of Patent: Sep. 28, 1999

[54] CLOSURE FOR A PASSENGER CAR COVER

[75] Inventors: Bodo Homann, Heimsheim; Wolfgang Moebius, Schwieberdingen; Hans Droste, Leonberg; Reiner Armbruster, Alpirsbach; Ralf Mertin, Herdecke, all of Germany

[73] Assignee: Dr. Ing. h.c.F. Porsche AG, Weissach, Germany

[21] Appl. No.: 08/917,379

[22] Filed: Aug. 26, 1997

Related U.S. Application Data

[63] Continuation of application No. 08/814,785, Mar. 10, 1997, abandoned.

[51] Int. Cl.$^6$ ........................................ E05C 3/06
[52] U.S. Cl. .................... 292/196; 292/DIG. 5; 292/223; 292/121
[58] Field of Search .......... 292/DIG. 5, DIG. 14, 292/DIG. 25, DIG. 31, 100, 200, 223, 226, 196, 121, 224, DIG. 4; 70/256

[56] References Cited

U.S. PATENT DOCUMENTS

| | | | |
|---|---|---|---|
| 4,351,561 | 9/1982 | Tulchiya et al. | 296/224 |
| 4,415,189 | 11/1983 | Kastelic, Jr. | 292/196 |
| 4,801,173 | 1/1989 | Trenkler | 292/DIG. 5 |
| 4,917,415 | 4/1990 | Wurl | 292/DIG. 5 |
| 5,035,463 | 7/1991 | Kato et al. | 292/223 |
| 5,435,615 | 7/1995 | Schmitz | 296/121 |

FOREIGN PATENT DOCUMENTS

| | | |
|---|---|---|
| 196 02 185 | 4/1997 | Germany . |
| 1 514 733 | 6/1978 | United Kingdom . |
| 2 267 116 | 11/1993 | United Kingdom . |

*Primary Examiner*—Suzanne Dino Barrett
*Assistant Examiner*—Teri Pham
*Attorney, Agent, or Firm*—Evenson, McKeown, Edwards & Lenahan, P.L.L.C.

[57] ABSTRACT

A closure for a passenger car cover which is stretched against a stationary frame of a vehicle body, comprises a housing which is arranged on the top side and has an operating element and comprises a swivellable locking hook which interacts with a connecting link mounted on the frame. In its locked position, while having an inconspicuous appearance, the lock does not project with respect to the adjoining top contour in the direction of the passenger compartment. During the opening operation, the operating element takes up a position advantageous for gripping by a user. In the locked position of the lock, a first and a second operating element are arranged in a sunk manner in a recess of the top frame. The two operating elements interact such that the second operating element will be moved into a lowered gripping position only after the operation of the first operating element.

29 Claims, 13 Drawing Sheets

CLOSURE FOR A PASSENGER CAR COVER

This application is a continuation application of, and claims the priority of, U.S. patent application Ser. No. 08/814,785, filed on Mar. 10, 1997, now abandoned. This application also claims the priority of German patent application no. 196 02 185.5, the disclosure of which is expressly incorporated by reference herein.

BACKGROUND AND SUMMARY OF THE INVENTION

The invention relates to a closure for a passenger car cover, particularly of a passenger car.

A known lock of the initially mentioned type (German Patent Document DE 93 02 292 U) comprises a housing arranged on the top side and having an operating element and also comprises a swivellable locking hook. In the locking position of the lock, the locking hook interacts with a connecting link mounted on the windshield frame disposed in front, whereas the operating element formed by an elongated handle extends with its free end away from the windshield frame toward the rear.

This arrangement has the disadvantage that, for reaching behind the free end of the operating element, a relatively high gap is provided between the bottom side of the top and the operating element, as the result of which the operating element projects relatively far downward in the direction of the passenger compartment.

In the case of tall vehicle occupants, the danger therefore exists that the operating element may project into the head impact area. In addition, in the closed position of the lock, in addition to the elongated handle, the housing and the locking hook are visible from the vehicle occupant side, which is disturbing for visual reasons.

It is an object of the invention to further develop a lock for fastening a top on an adjacent body-side frame such that the lock, in its closed position, does not project downward over the adjoining top contour facing the vehicle occupant compartment and, in this position, the lock has an inconspicuous appearance, but, during the opening operation of the lock, the operating element takes up a position which is favorable with respect to the gripping.

According to the invention, this object is achieved by providing a lock having a locked position in which first and second operating elements of the lock are arranged in a sunk manner in a recess of the top frame, the two operating elements interacting such that, only after the first operating element has been operated, will the second operating element be moved into a lowered gripping position.

The principal advantages achieved by means of the invention are that, as the result of the sunk arrangement of the lock having two operating elements in a recess of the top frame in the closed position of the lock, no parts exist which project with respect to the top frame and which project into the head impact area of a vehicle occupant.

By operating the first operating element, the second operating element is moved into a lowered gripping position so that, during the opening or closing operation, a good handling is ensured. The first operating element is constructed as a pressure plate which is surrounded by a plate-shaped bow section of a bow-type grip forming the second operating element.

By way of a detent device having a simple construction, the locking hook is additionally locked next to the over-dead-center location in the locked position. The additional locking can be released only by operating the pressure plate.

Furthermore, the bow-type grip is locked in its folded-back open position so that it can be used as a pull grip for the manual displacement of the top into the rear-side deposited position. The center lock ensures a simple one-hand operation. In the gripping position of the bow-type grip, the locking between the connecting link and the locking hook is still fully operative.

In the locked position, the two operating elements extend surface-flush with respect to one another and to the adjoining inner contours of the top frame and of the connecting link. In the locked position of the lock, no projecting parts exist on the interior side of the top and the two operating elements, virtually form the interior lining in sections.

Other objects, advantages and novel features of the present invention will become apparent from the following detailed description of the invention when considered in conjunction with the accompanying drawings.

DETAILED DESCRIPTION OF THE DRAWINGS

Figure 1:
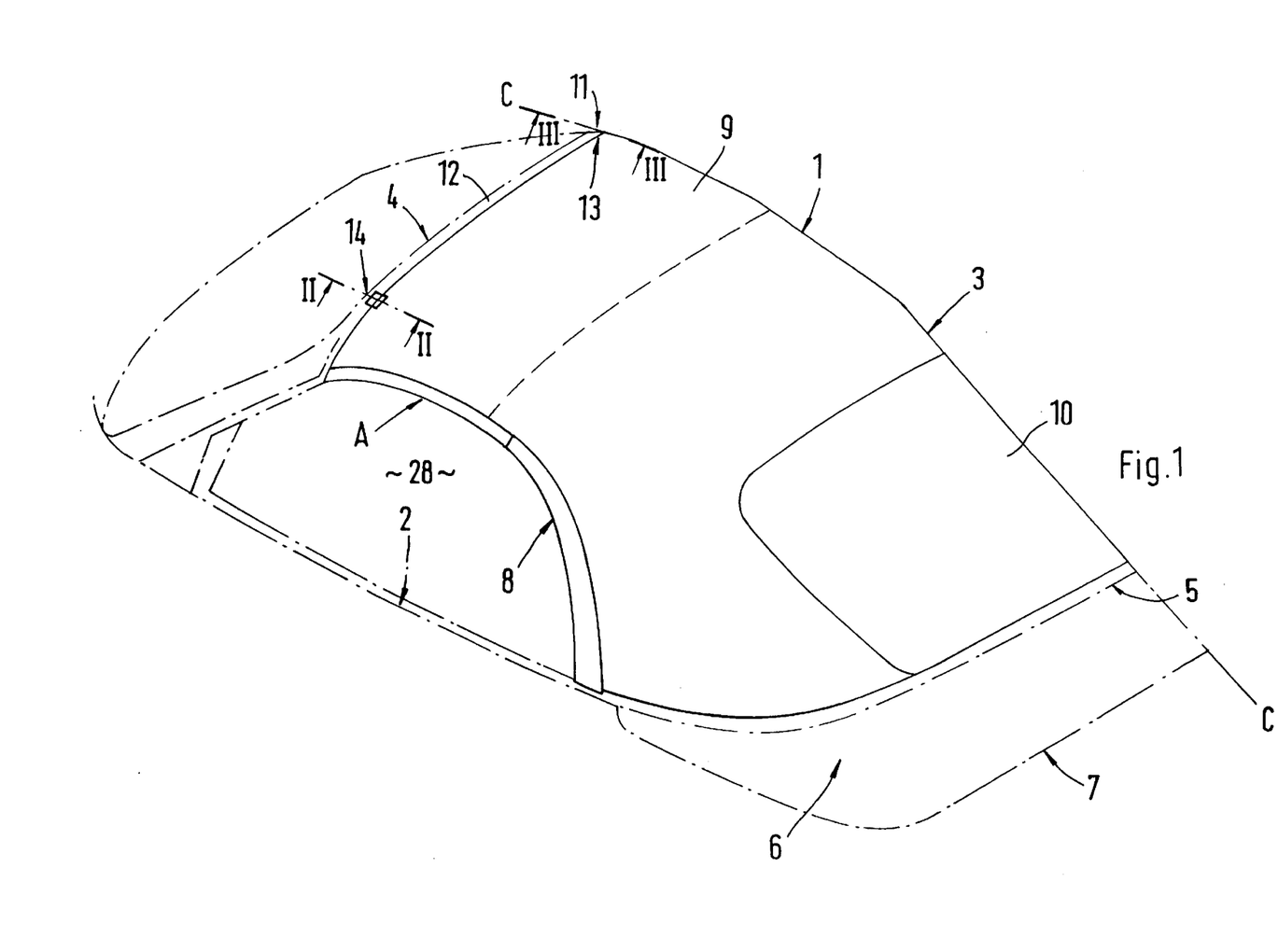
FIG. 1 is a perspective partial view diagonally from the rear of a vehicle having a top in the closed position.

FIG. 1 illustrates a partial area of a passenger car 1 which has a top 3 above a belt line 2. In the embodiment, the top 3 extends in its closed position A between a vehicle-body-side frame 4 formed by a windshield frame and a rear area 5. However, the vehicle-body-side frame 4 can also be formed by a rollover bar. In the rear area 5, a top compartment 6 is provided which is covered, at least in areas, in the upward direction by a top compartment lid 7. The top 3 which can be brought from a closed position A into a rear-side deposited position B not shown in detail and vice-versa, in the embodiment, is formed by a folding top which is composed of a folding top structure 8 swivellably linked to the vehicle body and of an elastic folding top cover 9 held in position at the folding top structure 8. In the rearward area of the folding top cover 9, a window pane 10 is provided which is formed by a flexible or rigid rear window.

By means of a releasable locking arrangement 11 on an upper transversely extending area 12 of the vehicle-body-side frame 4, the top 3 is held in position in its locked state A.

Figure 2:
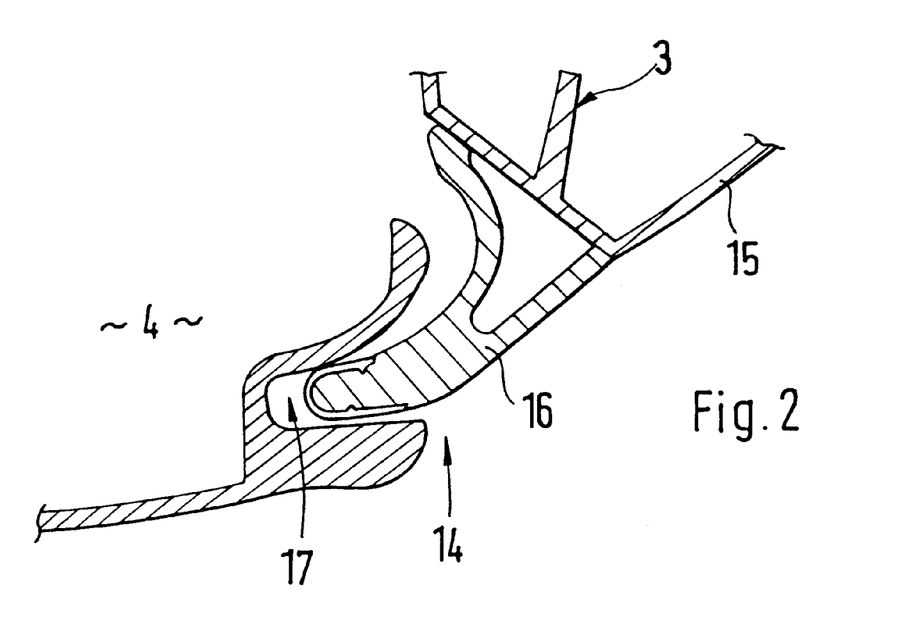
FIG. 2 is an enlarged sectional view according to Line II—II of FIG. 1 which shows a lateral centering device.

In the embodiment, the locking arrangement 11 comprises only a lock 13 arranged in the area of a longitudinal center plane C—C of the vehicle and two laterally exterior centering devices 14. However, two locks 13 arranged at a distance to one another may also be provided. By means of the two centering devices 14, the top 3 is fastened in the transverse and in the vertical direction of the vehicle (FIG. 2). Each centering device 14 comprises a projecting centering element 16 which is arranged on a forward dimensionally stable top frame 15 and which, in the closed position A of the top 3, interacts with a corresponding receiving device 17 of the frame 4. The centering element 16 is fastened on the top frame 15. The dimensionally stable, forward top frame 15 is formed by a large-surface cast part made of a light metal alloy.

The lock 13, which is constructed as a toggle catch and is arranged in the center, comprises essentially a housing 18 fastened on the bottom side of the dimensionally stable forward top frame 15; a locking hook 20, which, in its locked position D, is in an operative connection with a connecting link 19 arranged on the frame 4; as well as first and second operating elements 21, 22. By means of the lock 13, the top 3 is stretched in the longitudinal direction against th e stationary frame 4.

Figure 4:
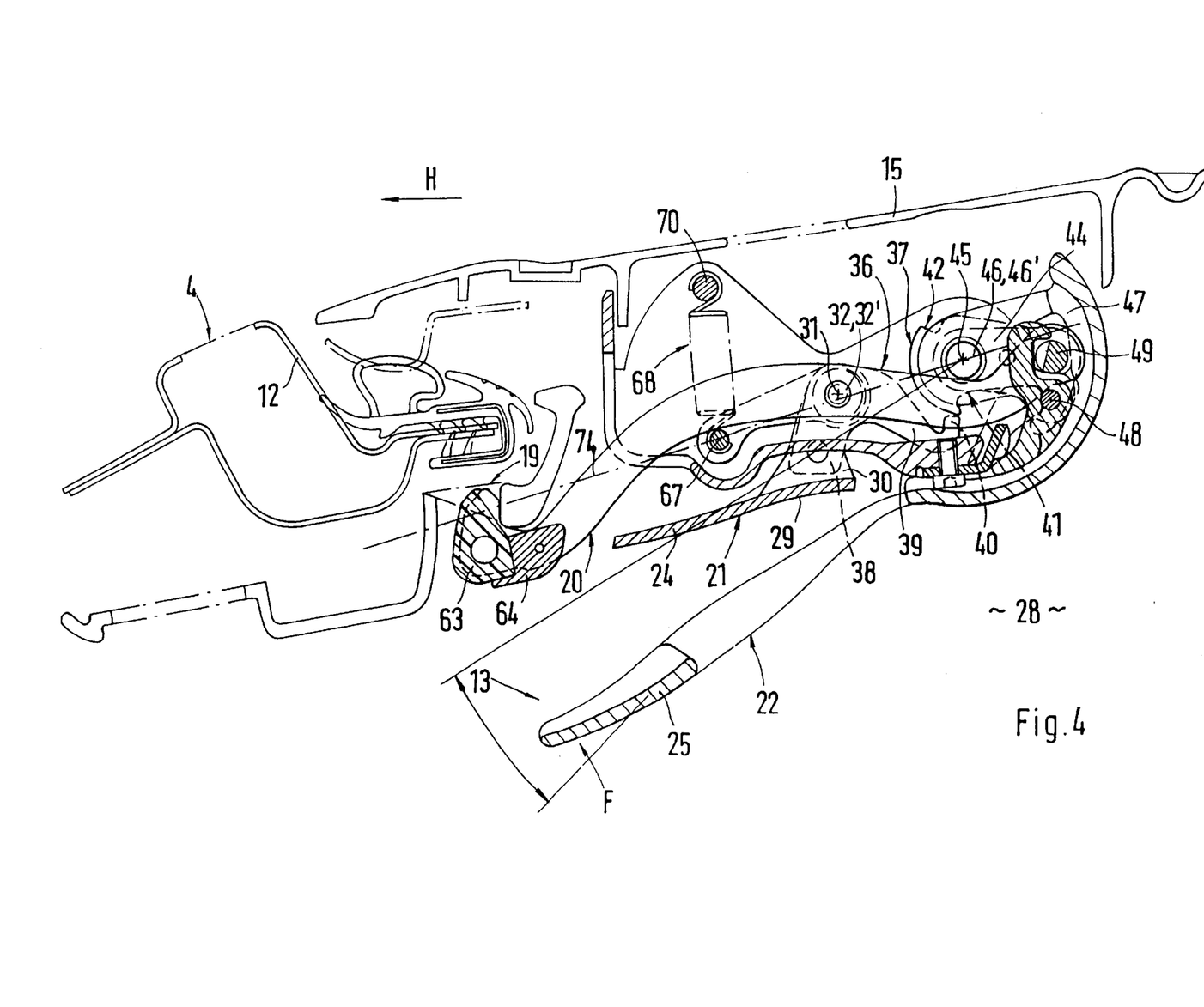
FIG. 4 is a sectional view similar to FIG. 3, in which the second operating element of the lock assumes its gripping position F.

In the locked position E of the lock 13, the two operating elements 21, 22 are arranged sunk in a trough-shaped recess 23 of the dimensionally stable, forward top frame 15 (FIG. 7) The two operating elements 21, 22 interact such that, only after the operation of the first operating element 21, the second operating element 22 is moved into a lowered gripping position F (FIG. 4).

In the locked position E of the lock 13, the two operating elements 21, 22 extend surface-flush with respect to one another and to the adjoining contours of the top frame 15 and of the connecting link 19 which face the passenger compartment 28. The first operating element 21 is constructed as a spring-loaded push button 24, whereas the second operating element 22 in the embodiment is formed by a spring-loaded bow-type grip 25. However, the second operating element 22 may also be constructed as a T-grip or an oblong grip. One or several leg springs act upon the bow-type grip 25 such that it is moved in the direction of the gripping position F.

Figure 11:
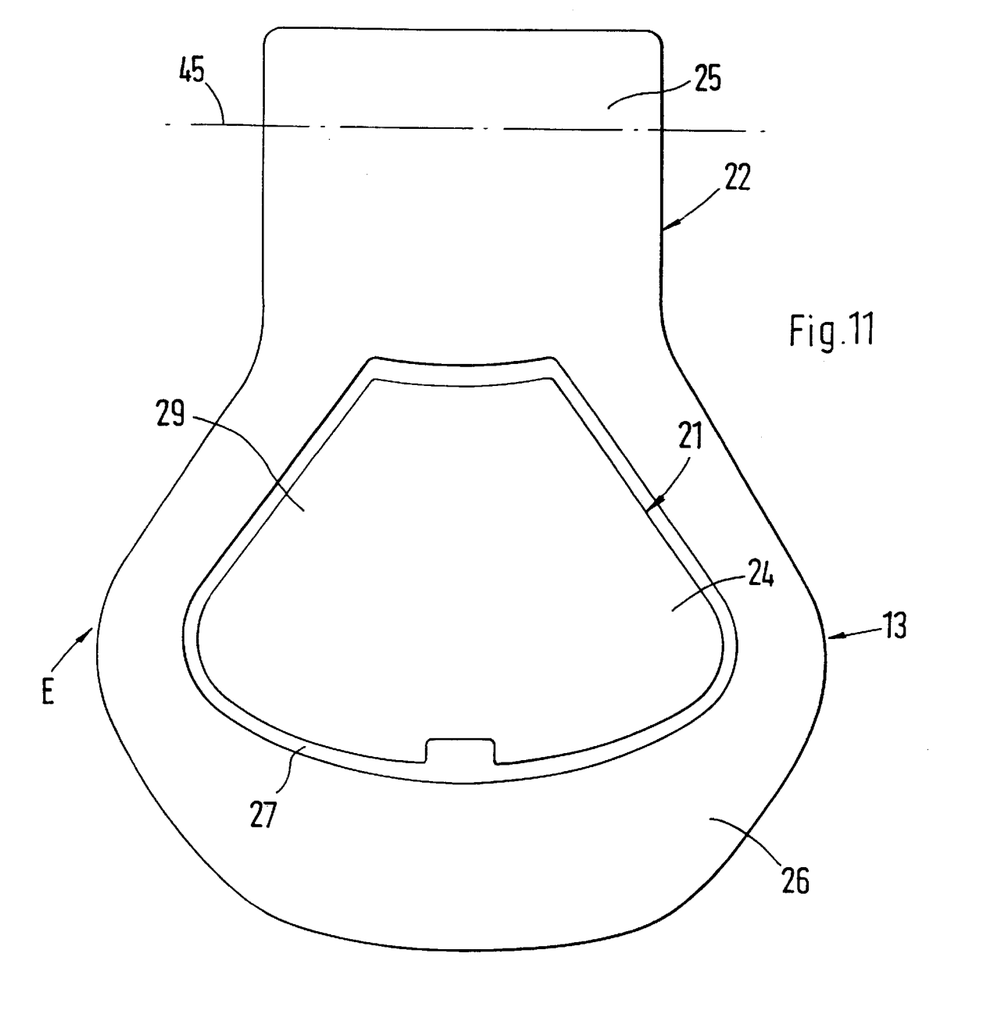
FIG. 11 is a view from the bottom of two operating elements of the lock in the locked position.
Figure 12:
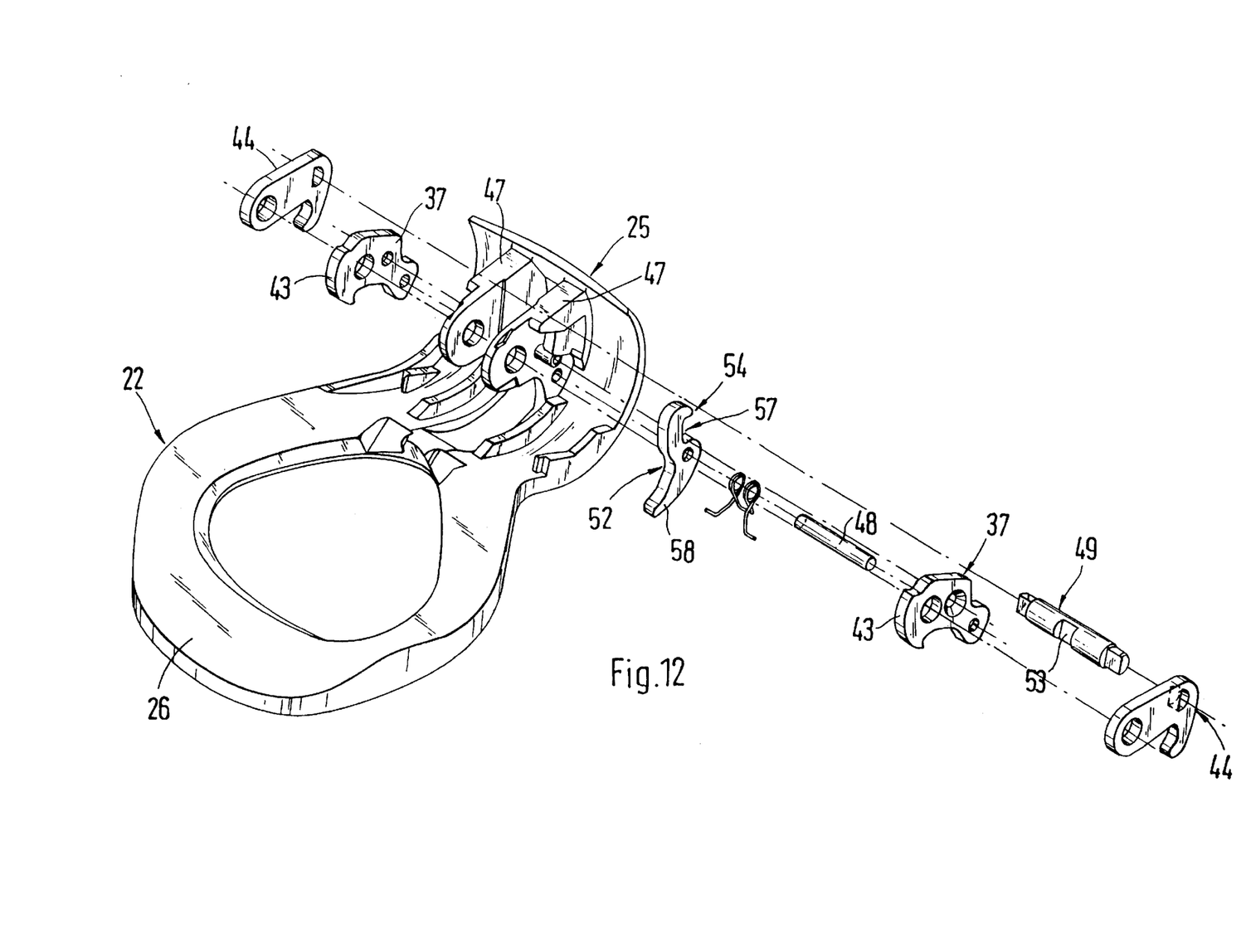
FIG. 12 is a perspective view of the bow-type grip and function elements of the lock.
Figure 13:
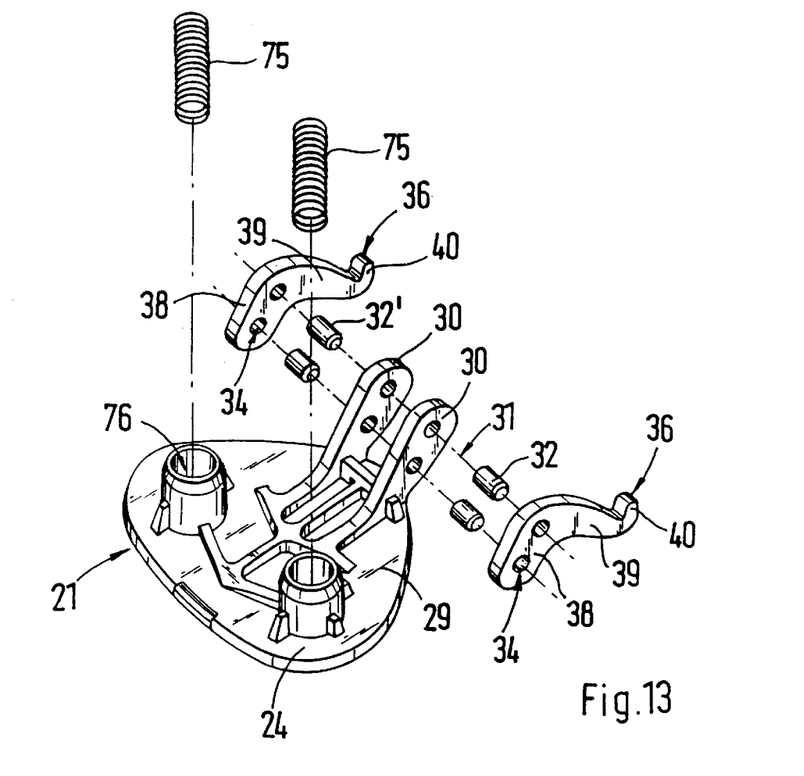
FIG. 13 is a perspective view of the push button and the function elements of the lock.

In the locked position E of the lock 13, the push button 24 is surrounded by a plate-shaped grip section 26 of the bow-type grip 25, a surrounding gap 27 extending between the grip section 26 and the interior push button 24 (FIG. 11). In the locked position E of the lock 13, the two operating elements 21, 22 cover the housing 18, the locking hook 20 and additional operating components of the lock 13 almost completely in the direction of the passenger compartment 28. In the locked position E, the bottom sides of the two operating elements 21, 22 virtually form an interior lining. The push button 24, which is composed of a lower plate-shaped section 29 and two upwardly projecting, upright webs 30, is disposed to be swivellable about a transversely extending, approximately horizontally aligned first axis of rotation 31 of the housing 18 (FIG. 13). The plate-shaped section 29 has, on the side facing the passenger compartment 28, a curved shape in the longitudinal direction and in the transverse direction. In the embodiment, the stationary first axis of rotation 31 comprises two mutually aligned pins 32, 32' which are held in position on spaced walls 33, 33' of the housing 18. The pins 32, 32' project over the interior walls 33, 33; in the direction of the locking hook 20. One lateral arm 66 respectively of a rocker 65 is swivellably disposed between the two walls 33, 33', on the pin 32, 32'. The upright webs 30 of the push button 24 are guided through openings of the housing 18 and are rotatably connected with the inner ends of the pins 32, 32'. The first axis of rotation 31, viewed in the longitudinal direction, extends approximately in a center area of the longitudinal course of the housing 18. By way of a detent device 35, the push button 24 is in an operative connection with the bow-type grip 25.

The detent device 35 comprises at least one exterior detent pawl 36 which is fastened to the push button 24 and which interacts with a function disk 37 held in position on the bow-type grip 25. In the embodiment, the detent device 35 is composed of two detent pawls 36 and two function disks 37.

Each exterior detent pawl 36 is swivellably disposed about the pin 32, 32' of the first axis of rotation 31, specifically between the interior wall 33 and the web 30. A downwardly directed first leg 38 of the exterior detent pawl 36 is firmly connected with the web 30 of the pressure plate 24 below the first axis of rotation 31 at 34 (by riveting, screwing, welding, a pin or the like). On the rearward end of a second leg 39 of each exterior detent pawl 36, which extends in the longitudinal direction of the vehicle, an upwardly directed, nose-shaped projection 40 is provided which, depending on the end position (locked position E or open position G) of the bow-type grip 25, interacts with one of two detents 41, 42 of the function disk 37. Between the two detents 41, 42, a circular-arc-shaped stop face 43 (FIG. 3) is provided on the function disk 37.

In the locked position E of the bow-type grip 25, the projection 40 interacts with the detent 41 of the function disk 37 and the bow-type grip 25 is locked in this position, in which case the detent 41 cannot be bridged manually. The detent illustrated in FIG. 3 can be released only by operating the push button 24 because, by the swivelling of the push button 24, the exterior detent pawls 36 are swivelled free out of the detents 41 (see gripping position F in FIG. 4).

In the open position G of the bow-type grip (FIG. 5), the projection 40 is in an operative connection with the other detent 42 in such a manner that the bow-type grip 25 is locked relative to the housing 18. As a result, the bow-type grip 25 can be used as a pull grip for the manual displacing of the top 3 into the deposited position B. By way of at least one driving lever 44, the bow-type grip 25 interacts with the locking hook 20 and is rotatably about a transversely extending, approximately horizontally aligned, second axis of rotation 45 connected with the housing 18.

Figure 9:
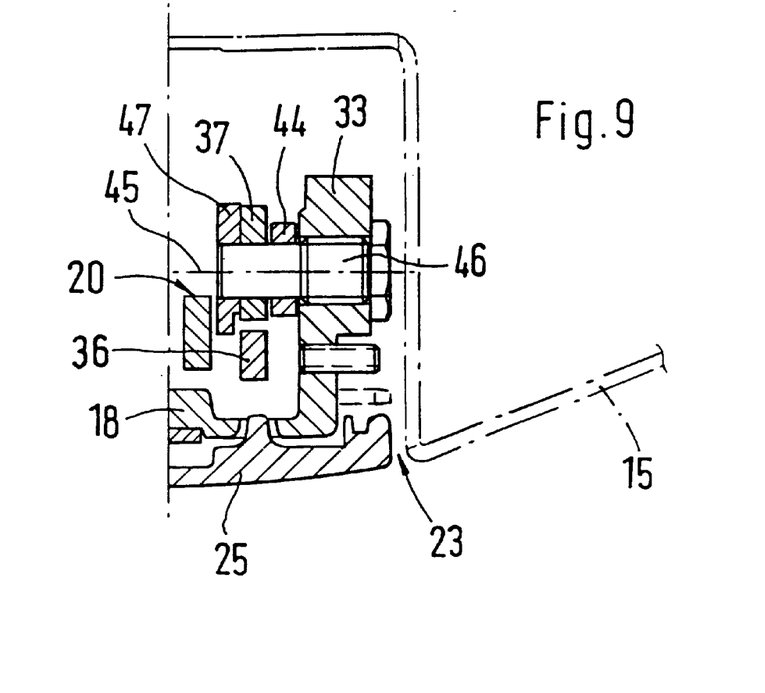
FIG. 9 is a partial sectional view according to Line IX—IX of FIG. 3.

Viewed in the driving direction H, the second axis of rotation 45 is situated farther in the rear and slightly higher than the first axis of rotation 31. According to FIG. 9, the second axis of rotation 45 is formed by two mutually aligned pins 46, 46' which extend on both sides of the central locking hook 20 and which are held in position on upright walls of the housing 18. Viewed from the outside to the inside, in each case, an end of the driving lever 44, the function disk 37 and a bent-away upright lug 47 of the bow-type grip 25 are rotatably disposed on the two pins 46, 46'. Away from the second axis of rotation 45, each function disk 37 is fastened on the bow-type grip 25 by way of another transversely extending pin 48. The pin 48 is guided through circular openings of the lugs 47 and in the transverse direction is secured against an axial displacement by a nose of the driving lever 44.

Figure 10:
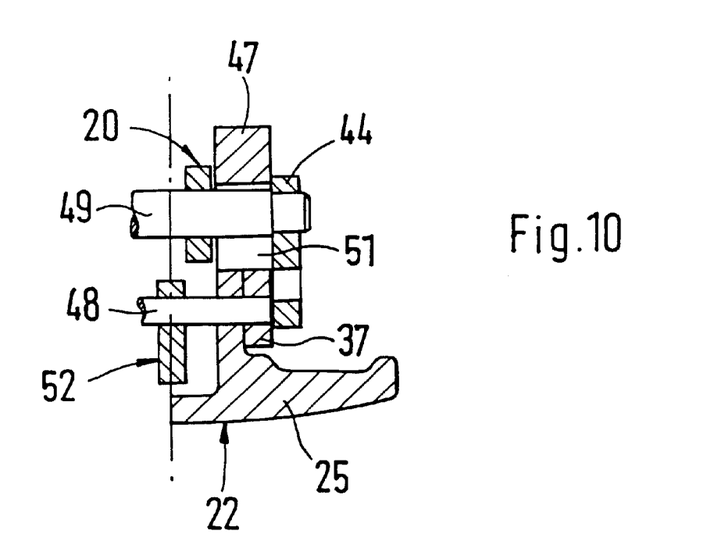
FIG. 10 is a partial sectional view according to Line X—X of FIG. 3.

The locking hook 20, which extends in the longitudinal direction of the vehicle, on its one end, is rotatably disposed on a pin 49 which is fixedly connected with the rearward ends 50 of spaced driving levers 44 and projects through slot openings 51, 51' of the lugs 47, 47' of the bow-type grip 25 (FIG. 10). In their width, the slot openings 51, 51' are only slightly larger than the diameter of the pin 49. However, they have a much larger height than the diameter of the pin 49 so that a relative movement between the bow-type grip 25 and the locking hook 20 is permitted. The lateral limits of the slot openings 51, 51' are formed by circular-arc sections. On the side facing a center detent pawl 52, the pin 49 has a flattening 53 at least locally on which a nose 54 of the detent pawl 52 is supported in the locked position E of the lock 13.

Figure 14:
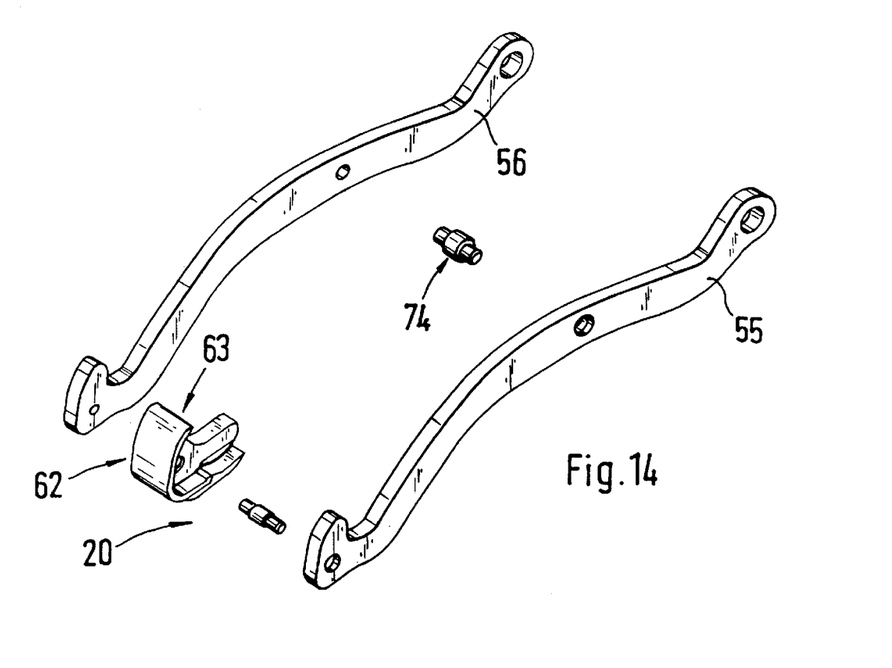
FIG. 14 is a perspective view of the components of the locking hook.
Figure 15:
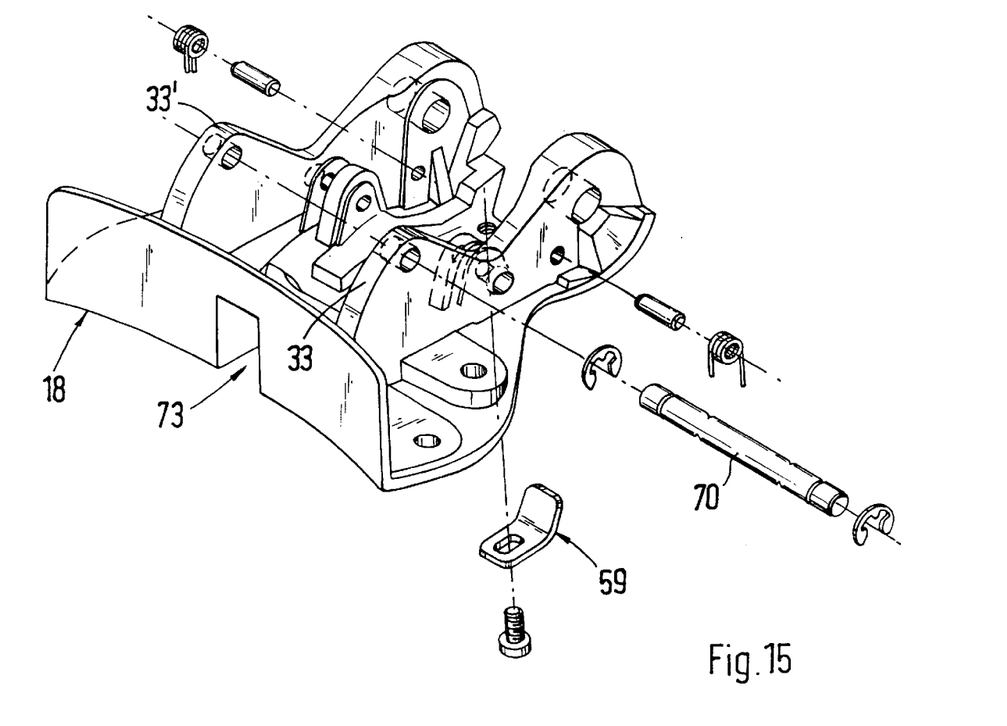
FIG. 15 is a perspective view of the housing of the lock with the function elements.
Figure 16:
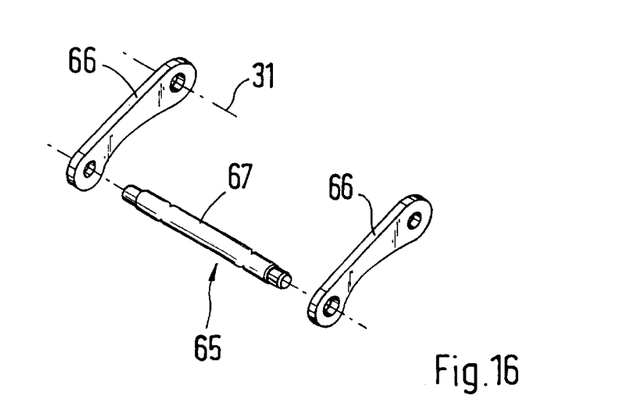
FIG. 16 is a perspective view of the spring-loaded rocker of the lock.
Figure 17:
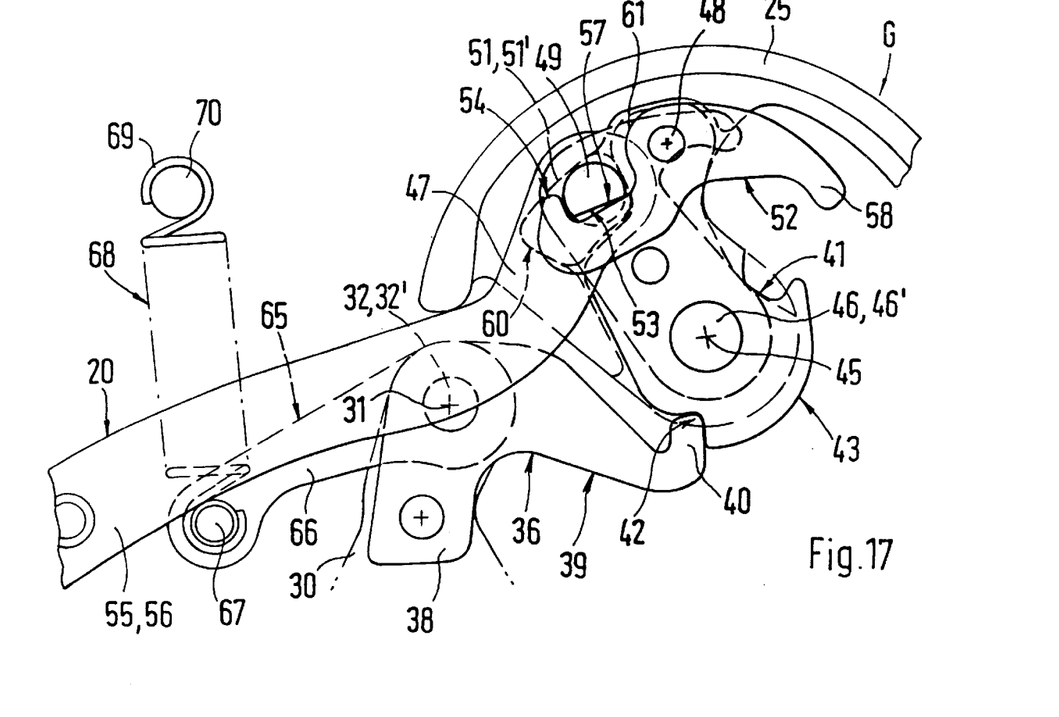
FIG. 17 is an enlarged cutout X of FIG. 5.
Figure 18:
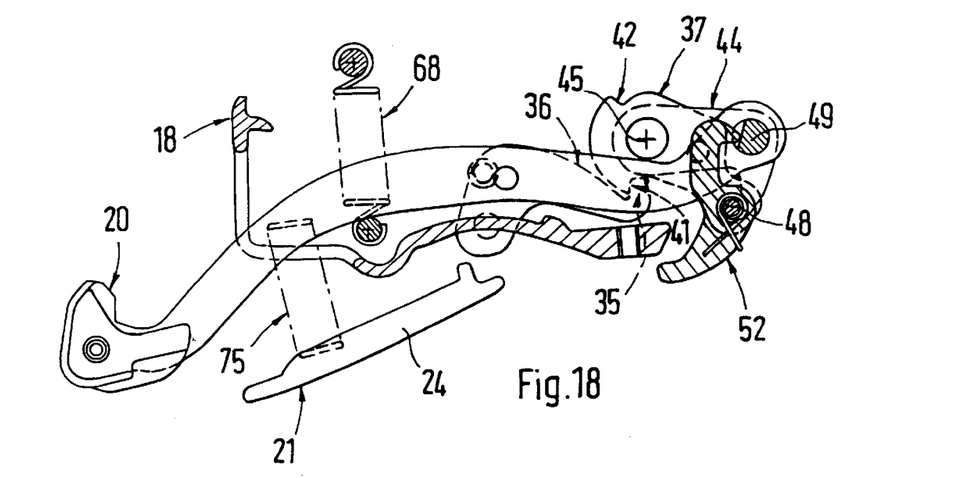
FIG. 18 is a view of the essential function elements of the lock corresponding to FIG. 3 without the housing and the bow-type grip.

The center detent pawl 52 is swivellably disposed on the transversely extending pin 48 of the bow-type grip 25 and extends in sections between the two plate-shaped parts 55, 56 of the locking hook 20 which extend at a slight distance from one another and is guided by the latter in the transverse direction (FIG. 14). During the operation, that is, when the push button 24 is pressed upwards, an approximately U-shaped recess 57 which adjoins the nose 54 reaches around the pin 49 so that, while the locking hook 20 is not moving along, the bow-type grip 25, because of the slot openings 51, 51', can be displaced from the locked position E into the gripping position F and vice-versa. During the opening and closing operation, a lower leg 58 of the center detent pawl 52 interacts with its free end with a housing-side guideway 59. In the locked position E of the bow-type grip 25, the pin 49 extends on the upper edge 60 of the slot opening 51, 51' and the nose 54 of the detent pawl 52 is supported on the flattening 53. During the operating of the push button 24, the exterior detent pawls 36 are swivelled clockwise so that the bow-type grip 25 together with the function disks 37 carries out a movement in the counter-clockwise direction. As a result, the pin 49 arrives in the recess 57 of the center detent pawl 52 situated underneath. As a result of the weight and a possible spring support, for example, by means of a torsion spring, the bow-type grip 25 will move downward into the gripping position F. In this position, the pin 49 rests against the lower edge 61 of the slot opening 51, 51'. During the subsequent opening movement of the bow-type grip 25, the nose 54 reaches around the pin 49 and superimposes by means of the detent pawl 52 the locking torque by way of the pin 49 on the operating element 22.

The two plate-shaped parts 55, 56 of the locking hook 20 are locally connected with one another in the forward and center area of their longitudinal course (sliding element 63, spacer 74). For avoiding noise, the end area 62 of the locking hook 20 facing the connecting link 19 is provided with a sliding element 63 made of a slidable plastic material (FIG. 14).

Figure 3:
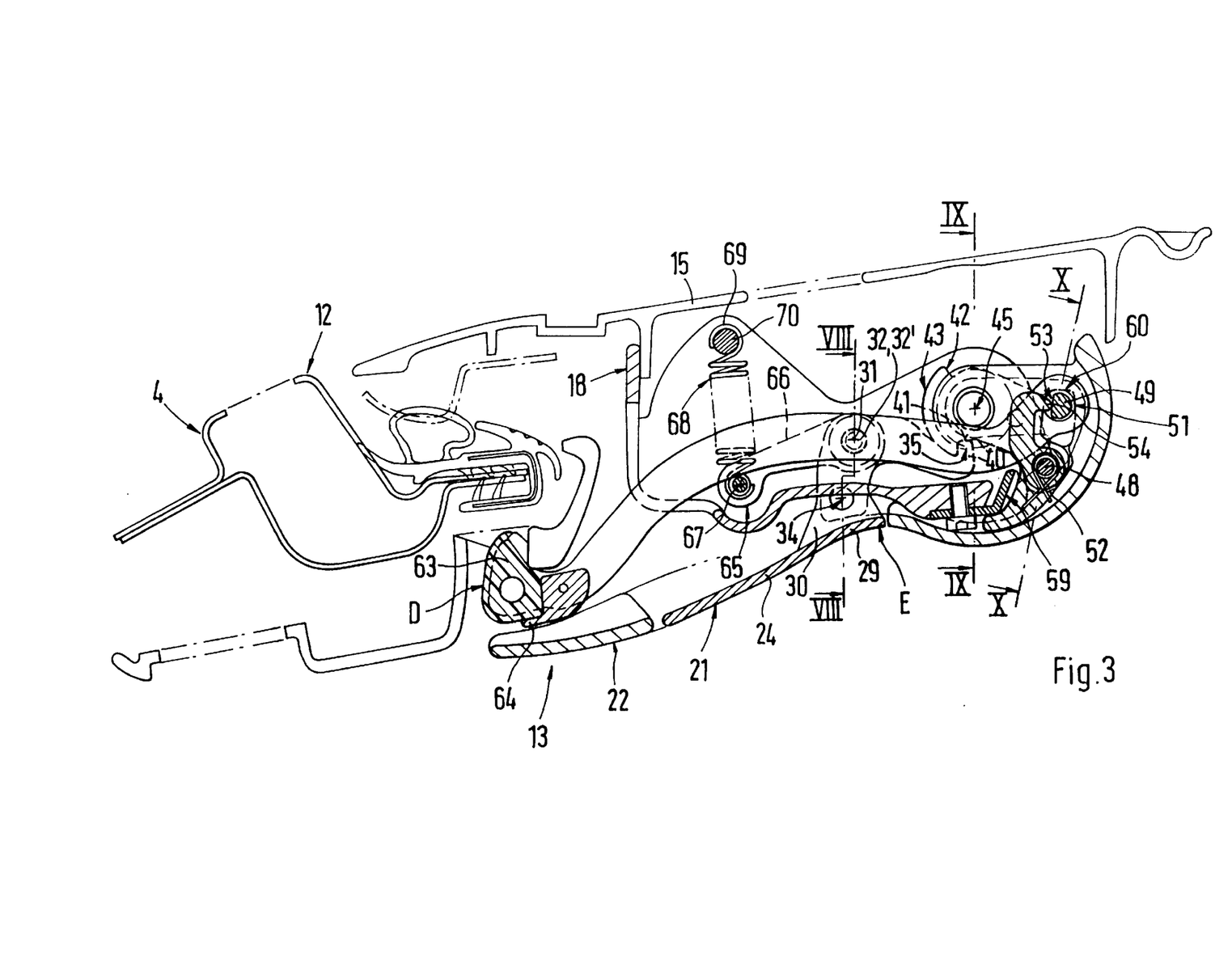
FIG. 3 is an enlarged sectional view according to Line III—III of FIG. 1 with the center lock in the locked position E.
Figure 7:
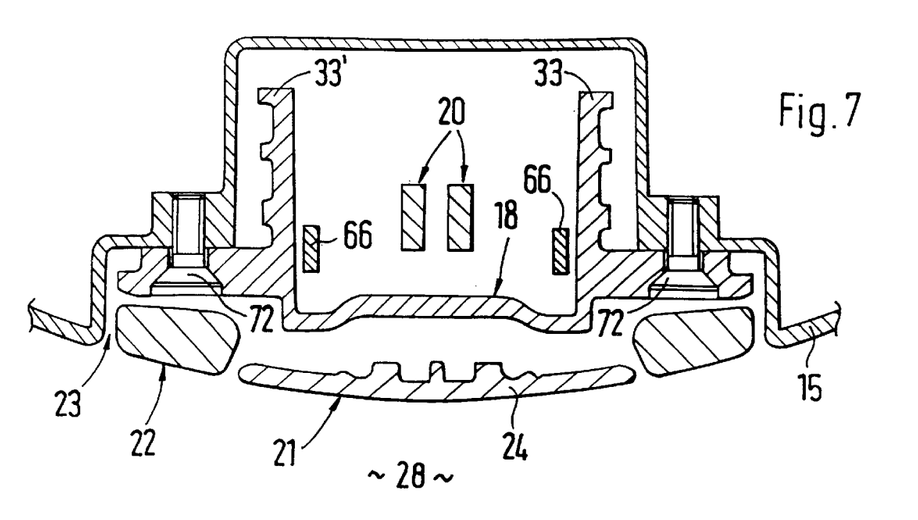
FIG. 7 is a sectional view according to Line VII—VII of FIG. 6.
Figure 8:
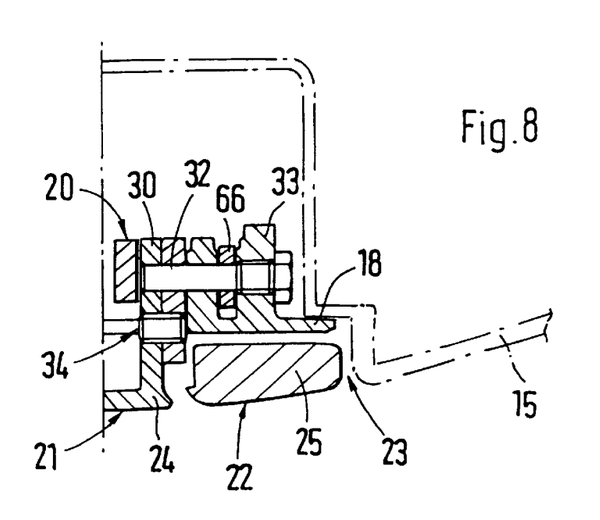
FIG. 8 is a partial sectional view according to Line VIII—VIII of FIG. 3.

Adjacent to the sliding element 63, a foam or rubber part 64 is clamped in between two plate-shaped parts 55, 56, which rubber part 64 protrudes in the downward direction (FIG. 3). This prevents noise, should the locking hook 20 come in contact with the top side of the plate-shaped grip section 26 and thus, in a form-locking manner, prevents a downward escaping of the locking hook 20 from the connecting link. In a forward area of the housing 18, the locking hook 20 is acted upon in the upward direction by means of a spring-loaded rocker 65. The spring-loaded rocker 65 is composed of two laterally exterior arms 66 and a connecting rod 67, in which case the arms 66 are rotatably disposed on the first axis of rotation 31 between the walls 33, 33' of the housing 18. At least one tension spring 68 is applied to the connecting rod 67 and is suspended by means of its other end 69 on a transversely extending pin 70 situated above. The other end of the tension spring 68 reaches around the connecting rod 67. This connecting rod 67 rests against the bottom side of the locking hook 20. In the transverse direction, the locking hook 20 is guided through a slot-shaped recess 73 of the forward, transversely extending housing wall 71. The fastening screws 72, which a provided adjoining the interior push button 24, in the locked position of the lock 13, are covered by the folded-up bow-type grip 25 (FIG. 7). The spring-loaded push button 24 is pressed downward by two pressure springs 75. By means of its one end, each pressure spring 75 is inserted into a cylindrical receiving device 76 of the push button 24, whereas the other end is supported on the bottom of the housing 18 (FIG. 13).

The opening of the lock 13 taking up its locked position E in FIG. 3 takes place as described in the following: First the push button 24 is pressed upward. This has the result that, on the one hand, the exterior detent pawls 36 carry out a swivel movement clockwise so that the nose-shaped projections 40 are swivelled free of the detents 41 of the function disk 37 and move counterclockwise. On the other hand, the upper nose 54 of the center detent pawl 52 is guided by the flattening 53 of the pin 49 around the top side of the pin 49 and the pin 49 arrives in the U-shaped recess 57 of the detent pawl 52. As the result of the weight of the bow-type grip 25 and a possible spring support (for example, by means of a torsion spring), the bow-type grip 25 is lowered into a gripping position F, in which case, because of the slot openings 51, 51' in the lugs 47, the bow-type grip 25 moves relative to the housing 18. In the lowered gripping position F, the locking between the connecting link 19 and the locking hook 20 is still fully operative. By means of the manual gripping around the bow-type grip 25 from above and a subsequent swivelling of the bow-type grip 25 counterclockwise toward the rear, the locking hook 20 is disengaged from the connecting link 19.

Figure 5:
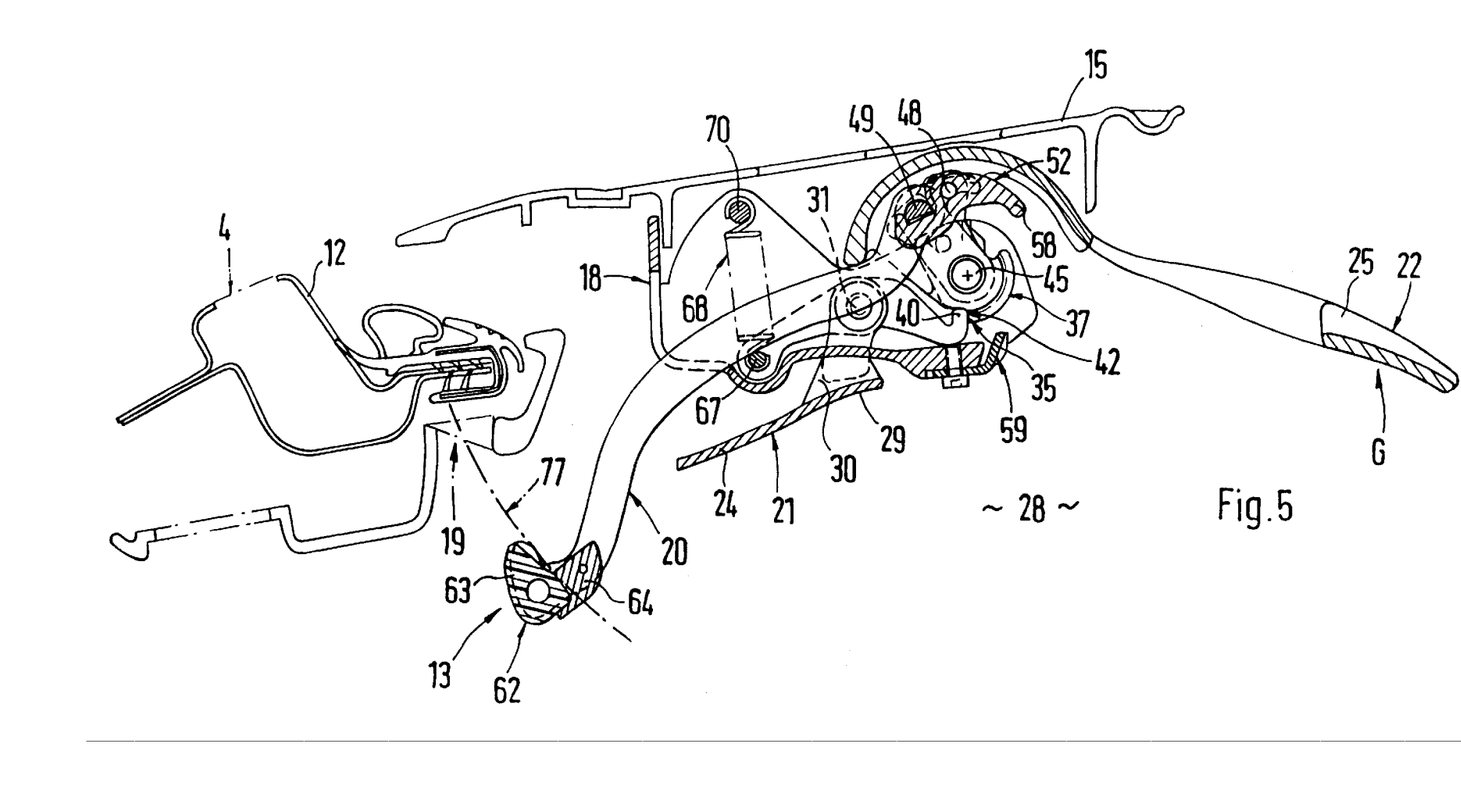
FIG. 5 is a sectional view similar to FIG. 3 which shows the open position G of the lock.
Figure 6:
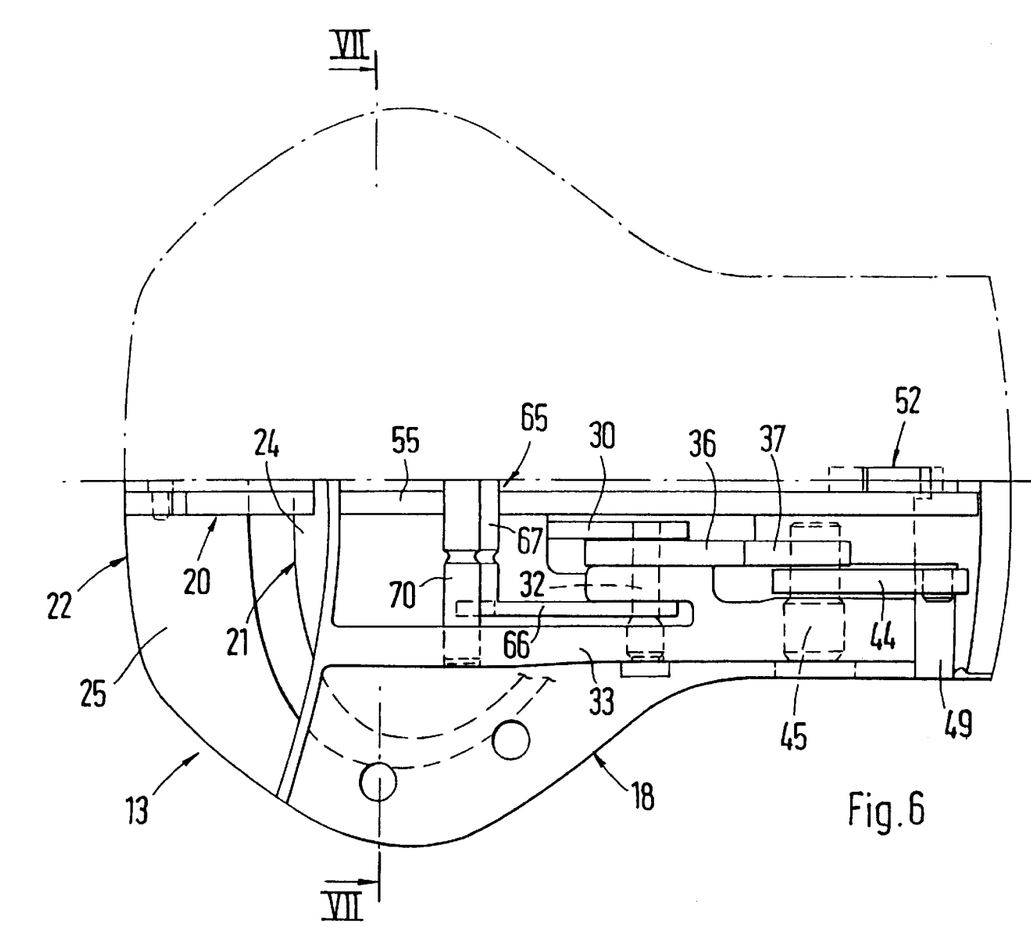
FIG. 6 is a top view of one half of the mirror-invertedly constructed lock.

In the open position G (FIG. 5), the bow-type grip 25 will lock because the exterior detent pawls 36 are in an operative connection with the second detent 42 of the functions disks 37. However, this locking can be bridged manually. The bow-type grip 25 will audibly lock in both adjustments E, G. In FIG. 5, the moving curve 77 of the locking hook 20 is indicated by a dash-dotted line. The locking of the top 3 on the frame 4 takes place in the reverse sequence.

The over-dead-center position of the lock 13 which already exists in the gripping position F and which is maintained during the further swivelling of the grip into the locked position E and vice-versa is characterized by line 74 in FIG. 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for securing a folding top to a stationary member of a motor vehicle, said arrangement comprising:
   a folding top frame member for carrying said folding top, said folding top frame member defining a recess;
   a housing arranged in said recess and coupled to said folding top frame member;
   first and second operating elements coupled to said housing and located in said recess in a locked position, said first and second operating elements being operatively coupled with each other such that said first operating element is operable to release said second operating element from said locked position into a gripping position extending at least partially outside of said recess; and
   a swivellable locking hook to be engaged with a connecting link mounted on the stationary member, said swivellable locking hook being operatively coupled to said second operating element.

2. An arrangement according to claim 1, wherein the first and second operating elements in the locked position extend approximately surface-flush with respect to one another and with respect to adjoining contours of the folding top frame member.

3. An arrangement according to claim 1, wherein, in the locked position, the two operating elements almost completely cover the housing, the locking hook and additional operating components of the lock in a direction of a passenger compartment.

4. An arrangement according to claim 1, wherein the first operating element is formed by a spring-loaded push button which is swivellably disposed on the housing.

5. An arrangement according to claim 4, wherein the push button is disposed on a transversely extending, approximately horizontally aligned first axis of rotation of the housing, the axis of rotation being formed by two mutually spaced, aligned pins.

6. An arrangement according to claim 4, wherein the second operating element is formed by a bow-type grip swivellably disposed on the housing.

7. An arrangement according to claim 6, wherein the push button is circumferentially surrounded by a plate-shaped grip section of the bow-type grip.

8. An arrangement according to claim 6, wherein the push button is in an operative connection with the bow-type grip via a detent device, the bow-type grip being locked in two end positions via the detent device.

9. An arrangement according to claim 8, wherein the detent device comprises at least one exterior detent pawl fixedly connected with the push button, which exterior detent pawl interacts with a function disk mounted on the bow-type grip.

10. An arrangement according to claim 9, wherein two mutually spaced detents are formed on the function disk, a nose-shaped projection of the detent pawl being in an operative connection with one of these detents in each of said end positions.

11. An arrangement according to claim 4, wherein the bow-type grip is rotatably connected with the housing about a transversely extending, approximately horizontally aligned, second axis of rotation, the second axis of rotation being formed by two aligned pins which are arranged on both sides of the locking hook extending therebetween.

12. An arrangement according to claim 11, wherein the locking hook is connected with the bow-type grip by way of at least one driving lever.

13. An arrangement according to claim 12, wherein one said driving lever respectively is disposed on each of the two pins, the two driving levers being fixedly connected with one another by way of a continuous pin which is guided through oblong slot openings of spaced lugs of the bow-type grip, a central area of said pin being rotatably connected with the rearward end of the locking hook.

14. An arrangement according to claim 13, wherein the locking hook is composed of two plate-shaped parts which extend at a narrow distance with respect to one another and which are locally fixedly connected with one another.

15. An arrangement according to claim 14, wherein a center detent pawl is swivellably disposed on the bow-type grip and extends in sections between the two plate-shaped parts of the locking hook.

16. An arrangement according to claim 15, wherein the center detent pawl has a U-shaped recess and an adjoining nose on an upper leg, and wherein based on the position of the bow-type grip, the nose or the recess interacts with the pin connecting the driving levers.

17. An arrangement according to claim 15, wherein, a lower, bent leg of the center detent pawl has a free end which interacts with a guideway mounted on the housing.

18. An arrangement according to claim 6, wherein fastening screws for fastening the housing on the top frame are covered by the bow-type grip in a direction toward a passenger compartment.

19. An arrangement according to claim 1, wherein a spring-loaded rocker acts on the locking hook in a forward area of the housing.

20. An arrangement according to claim 19, wherein the rocker is composed of two lateral arms and a connecting rod, the arms being swivellably disposed on a first axis of rotation, wherein tension springs are connected to the connecting rod and to a shaft situated above.

21. An arrangement according to claim 1, wherein, in the gripping position of the second operating element, the locking between the locking hook and the connecting link is still completely operative.

22. An arrangement according to claim 1, wherein said first and second operating elements are operatively coupled with each other via means for releasing said second operating element from said locked position to said gripping position when said first operating element is operated.

23. An arrangement according to claim 22, further comprising means for operatively coupling said second operating element and said locking hook such that movement of said second operating element from said lowered gripping position into an open position disengages said locking hook from said connecting link.

24. Lock for a motor vehicle cover, comprising:
   a housing t o be attached to the cover;
   a first operating element articulated on the housing about a first axis of rotation;
   a second operating element articulated on the housing about a second axis of rotation;
   at least one driving lever articulated on the housing about said second axis of rotation;
   a locking hook rotatably mounted relative to said driving lever;
   at least one exterior detent pawl articulated on said housing about said first axis of rotation, said exterior detent pawl being fixed relative to said first operating element;

a function disk articulated on said housing and articulated on said second operating element via a transversely extending pin which is mounted rotatably in the second operating element;

a projection of the exterior detent pawl engaging a first detent of the function disk when said second operating element is in a locked position;

said projection of the exterior detent pawl engaging a second detent of the function disk when said second operating element is in an open position.

25. Lock according to claim 24, further comprising:

a guiding pin fixed to said driving lever, said locking hook being articulated on said guiding pin; and a center detent pawl articulated on said transversely extending pin, said center detent pawl engaging said guiding pin.

26. An arrangement for securing a folding top of a vehicle, comprising:

a stationary vehicle member;

a movable folding top frame member for holding said cover, said movable folding top frame member defining a recess;

a connecting link mounted on said stationary vehicle frame member; and a locking mechanism mounted on said folding top frame member, said locking mechanism comprising:

a housing arranged in said recess and coupled to said movable folding top frame member, first and second operating elements coup led to said housing and located in said recess in a locked position, means for operatively coupling said first and second operating elements such that operation of said first operating element releases said second operating element from a locked position into a lowered gripping position, a locking hook coupled to said second operating element and engageable with said connecting link, and means for operatively coupling said second operating element and said locking hook such that movement of said second operating element from said lowered gripping position into an open position disengages said locking hook from said connecting link.

27. An arrangement according to claim 26, wherein the first operating element is a spring-loaded push button which is swivellably disposed on the housing.

28. An arrangement according to claim 27, wherein the second operating element is a bow-type grip swivellably disposed on the housing.

29. An arrangement according to claim 28, wherein the bow-type grip includes a plate-shaped grip section which circumferentially surrounds the push button.

* * * * *